I. C. FORBES.
Machine for Reducing Wood to Fiber for Paper Stock, &c
No. 218,953.　　　Patented Aug. 26, 1879.
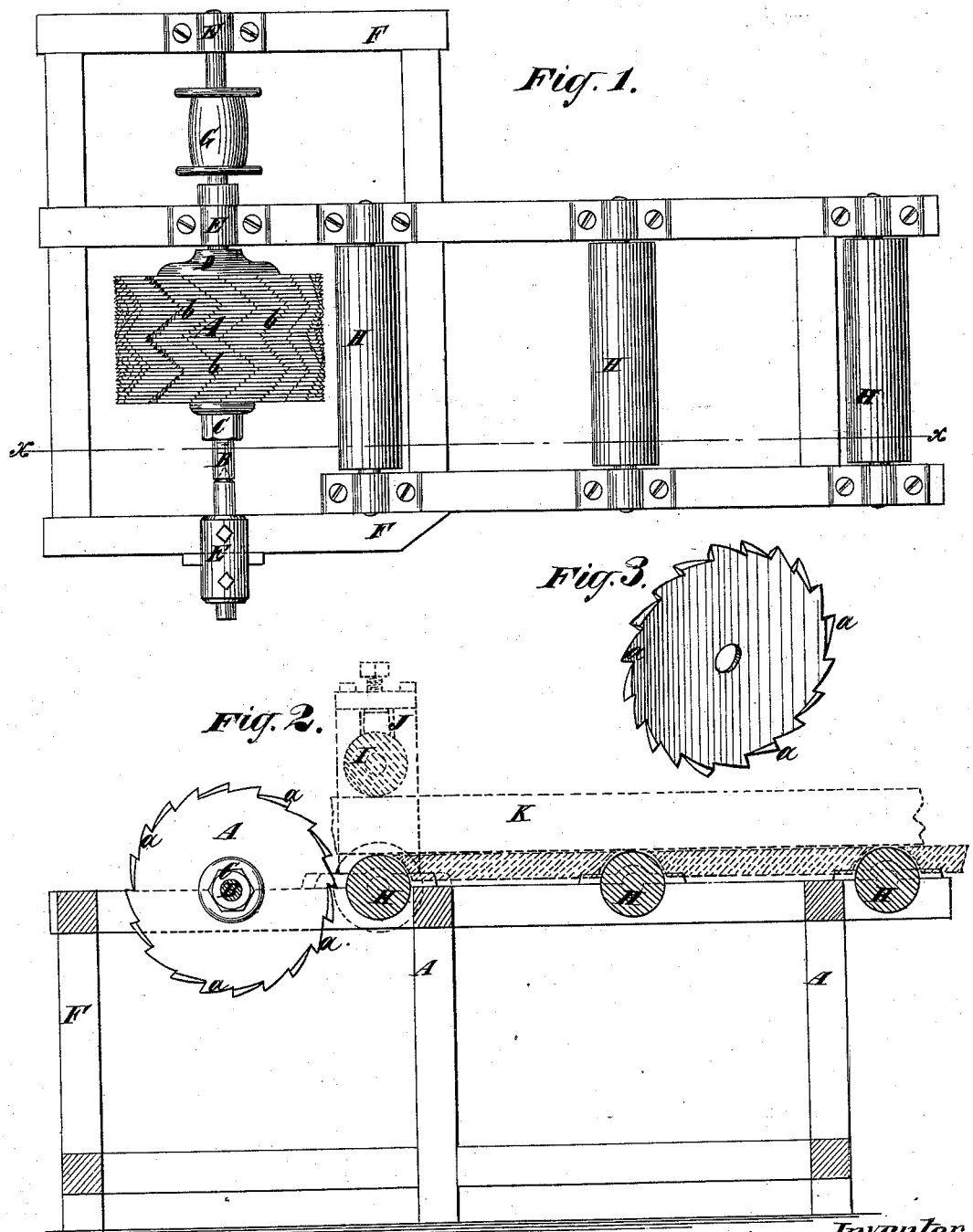

UNITED STATES PATENT OFFICE

IRA C. FORBES, OF MOUNT PLEASANT, NEW YORK.

IMPROVEMENT IN MACHINES FOR REDUCING WOOD TO FIBER FOR PAPER-STOCK, &c.

Specification forming part of Letters Patent No. 218,953, dated August 26, 1879; application filed June 14, 1879.

*To all whom it may concern:*

Be it known that I, IRA C. FORBES, of Mount Pleasant, in Shendaken township, Ulster county, and State of New York, have invented certain new and useful Improvements in Machines for Reducing Wood to Fiber for Paper-Stock, and other purposes, of which the following is a specification.

The object of this invention is to provide a machine for reducing wood to fiber of such a nature that it may be very easily reduced to pulp for the manufacture of paper, and will produce a paper of superior quality, such fiber being also applicable to other purposes in the art.

My invention consists in a rotary drum, with which wood to be reduced may be brought in contact, composed of a series of saws arranged side by side upon a mandrel or shaft, each saw having the sides of its teeth beveled to a sharp point, alternate teeth being beveled on opposite sides, so that the exterior of the said drum presents a series of angular points throughout its entire length, for acting upon the surface of wood presented to it, and reducing it by tearing the fiber away in finely-divided shreds, which may be easily reduced to pulp.

For the purpose of rendering the saws more effective in their action, I prefer to arrange them so that the teeth of each of the saws shall be slightly in advance of the teeth of the saw upon one side of it and slightly behind the teeth of the saw upon the other side of it, whereby the points of their teeth are presented in lines running spirally along the drum oblique to the axis and planes of rotations of said saws.

In the accompanying drawings, Figure 1 represents a plan of a machine embodying my improvements. Fig. 2 is a vertical longitudinal section thereof on the line $x$ $x$, Fig. 1; and Fig. 3 is a perspective view of one of the saws detached.

Similar letters of reference designate corresponding parts in all the figures.

A designates a drum, with which wood to be reduced is brought in contact. This drum is composed of a series of saws mounted upon a central mandrel or shaft, B, and held in tight face-to-face contact with one another by means of an adjustable nut, C, acting in conjunction with a collar or flange, D, upon the mandrel or shaft B. The said mandrel or shaft is properly supported in bearings E in the frame-work F of the machine, and is provided with a pulley, G, through which a belt may impart rotary motion to the mandrel or shaft and to the drum A.

By reference to Figs. 2 and 3, it will be clearly seen that the outer faces of the teeth $a$ of the saws composing the drum A are beveled, alternate teeth being beveled in opposite directions. Owing to this beveling of the teeth $a$ the drum A presents a series of angular points extending from its entire surface, and as alternate teeth of each saw are beveled in opposite directions, the whole surface of the wood presented to the drum is acted upon by these angular points, and the fibers separated in thin thread-like shreds, very easily reduced to pulp, and very useful for making paper or analogous purposes.

For the purpose of rendering the drum A more effective in its action, I set and secure the saws of which it is composed upon the mandrel or shaft B so that the teeth of each saw are slightly in advance of the teeth of the saw upon one side of it, and slightly behind the teeth of the saw upon the other side of it, so that the said saws present their teeth in lines oblique to the axis and planes of rotation running spirally partially around the drum. In Fig. 1, I have represented these spiral lines as running for a short distance in one direction, then reversed and running in the reverse direction, thus forming a series of zigzag lines, $b$, upon the surface of the drum A.

H designates rollers mounted in bearings in the frame-work F of the machine, and over which the wood to be presented to the drum may pass, thus rendering the feeding of the log toward the drum easy to the workman.

If desirable, pressure-rollers I, mounted in adjustable bearings J, and represented in dotted outline in Fig. 2, may be used, and in such case, by imparting a rotary motion to any of the rollers, the stick of wood K will be fed positively toward the drum, and held securely while acted on by the teeth of the drum.

Wood may be presented to the drum either endwise or crosswise of the grain; but it is preferred to present it endwise, as finer fiber may thus be produced.

As the teeth $a$ of the saws have sharp angular points instead of square points, like ordinary saw-teeth, the wood will be converted into long fiber of a very superior quality, much less granular than that produced in any other machine.

In addition to its utility for paper-stock, the wood fiber thus formed may be mixed with any suitable adhesive substance, and used for making a variety of articles, such, for instance, as barrels, floor-cloth, and other like articles.

What I claim as my invention, and desire to secure by Letters Patent, is—

1. In a machine for reducing wood to fiber, a rotary drum composed of a series of saws arranged side by side upon a mandrel or shaft, each saw having the sides of its teeth beveled to sharp points, alternate teeth being beveled on opposite sides, substantially as and for the purpose specified.

2. In a machine for reducing wood to fiber, a rotary drum composed of a series of saws arranged side by side upon a mandrel or shaft, so that the teeth of each saw are slightly in advance of the teeth of the saw upon one side of it and slightly behind the teeth of the saw upon the other side of it, whereby the points of the teeth are presented in lines running spirally along the drum oblique to the axis and planes of rotation of the saws, substantially as and for the purpose specified.

3. In a machine for reducing wood to fiber, a rotary drum composed of a series of saws arranged side by side upon a mandrel or shaft, each saw having the sides of its teeth beveled to sharp points, alternate teeth being beveled on opposite sides, and each saw arranged so that its teeth are slightly in advance of the teeth of the saw on one side of it and slightly behind the teeth of the saw upon the other side of it, whereby the points of the teeth are presented in lines running spirally along the drum oblique to the axes and planes of rotation of the saws, substantially as and for the purpose specified.

IRA C. FORBES.

Witnesses:
 V. D. LAKE,
 ALBERT LAKE.